United States Patent
Choi et al.

(10) Patent No.: US 7,132,304 B2
(45) Date of Patent: Nov. 7, 2006

(54) FIELD EMISSION DEVICE, DISPLAY ADOPTING THE SAME AND METHOD OF MANUFACTURING THE SAME

(75) Inventors: Jun-Hee Choi, Suwon-si (KR); Andrei Zoulkarneev, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/002,073

(22) Filed: Dec. 3, 2004

(65) Prior Publication Data
US 2005/0133779 A1    Jun. 23, 2005

(30) Foreign Application Priority Data
Dec. 22, 2003   (KR)  .................. 10-2003-0094415

(51) Int. Cl.
*H01L 21/00*   (2006.01)
(52) U.S. Cl. .................. 438/20; 345/75.2; 977/939; 257/E51.04
(58) Field of Classification Search .................. 438/20; 977/939; 257/E51.04; 345/75.2; 313/495
See application file for complete search history.

(56) References Cited

U.S. PATENT DOCUMENTS

| | | | |
|---|---|---|---|
| 5,920,151 A | | 7/1999 | Barton et al. |
| 5,955,850 A | * | 9/1999 | Yamaguchi et al. ......... 313/495 |
| 5,973,444 A | * | 10/1999 | Xu et al. .................... 313/309 |
| 6,476,548 B1 | * | 11/2002 | Xia ............................ 313/497 |
| 6,489,726 B1 | * | 12/2002 | Xia ........................... 315/169.2 |
| 6,541,906 B1 | * | 4/2003 | Lee et al. .................... 313/495 |
| 6,599,847 B1 | * | 7/2003 | Jang et al. .................. 438/787 |
| 6,686,680 B1 | * | 2/2004 | Shaw et al. ................. 313/309 |
| 2002/0080099 A1 | * | 6/2002 | Song et al. ................ 345/75.2 |
| 2002/0135548 A1 | * | 9/2002 | Moon ........................ 345/75.2 |
| 2003/0057825 A1 | * | 3/2003 | Kusunoki et al. ........... 313/495 |
| 2003/0113450 A1 | * | 6/2003 | Park et al. ............. 427/255.28 |
| 2003/0122118 A1 | * | 7/2003 | Lee et al. ...................... 257/10 |
| 2003/0141495 A1 | * | 7/2003 | Lee et al. ...................... 257/10 |
| 2003/0141798 A1 | * | 7/2003 | Jin et al. ..................... 313/310 |
| 2004/0080260 A1 | * | 4/2004 | Park et al. ................... 313/495 |
| 2004/0104655 A1 | * | 6/2004 | Kodera et al. .............. 313/292 |
| 2004/0130260 A1 | * | 7/2004 | Sagawa et al. ............. 313/495 |
| 2004/0169458 A1 | * | 9/2004 | Fran et al. ................... 313/495 |
| 2004/0195957 A1 | * | 10/2004 | Hu et al. .................... 313/495 |
| 2004/0253758 A1 | * | 12/2004 | Jung et al. ..................... 438/22 |
| 2005/0012692 A1 | * | 1/2005 | Moon ........................ 345/75.2 |
| 2005/0035701 A1 | * | 2/2005 | Choi et al. .................. 313/309 |
| 2005/0040752 A1 | * | 2/2005 | Lee et al. .................... 313/495 |

(Continued)

*Primary Examiner*—Matthew Smith
*Assistant Examiner*—John M. Parker
(74) *Attorney, Agent, or Firm*—Robert E. Bushnell, Esq.

(57) ABSTRACT

A field emission device comprises a glass substrate, an emitter electrode formed on the glass substrate, a carbon nanotube (CNT) emitter formed on the emitter electrode, and a gate stack formed around the CNT emitter for extracting electron beams from the CNT emitter and focusing the extracted electron beams onto a given position. The gate stack includes a mask layer covering the emitter electrode and provided around the CNT emitter, a gate insulating layer formed on the mask layer to a predetermined height, a mirror electrode formed on an inclined plane of the gate insulating layer, a gate electrode formed on the gate insulating layer and spaced apart from the mirror electrode, and a focus gate insulating layer and a focus gate electrode sequentially formed on the gate electrode. The field emission device is manufactured and employed in a display device in accordance with the present invention.

17 Claims, 18 Drawing Sheets

U.S. PATENT DOCUMENTS

| | | | |
|---|---|---|---|
| 2005/0046322 A1* | 3/2005 | Kim et al. | 313/309 |
| 2005/0057168 A1* | 3/2005 | Song et al. | 315/111.81 |
| 2005/0067937 A1* | 3/2005 | Sheu et al. | 313/309 |
| 2005/0083267 A1* | 4/2005 | Yotani et al. | 345/75.2 |
| 2005/0098720 A1* | 5/2005 | Traynor et al. | 250/288 |
| 2005/0112983 A1* | 5/2005 | Park | 445/49 |
| 2005/0127821 A1* | 6/2005 | Song et al. | 313/502 |
| 2005/0139817 A1* | 6/2005 | Choi et al. | 257/10 |
| 2005/0197032 A1* | 9/2005 | Lee et al. | 445/24 |
| 2005/0236963 A1* | 10/2005 | Kang et al. | 313/495 |
| 2005/0248256 A1* | 11/2005 | Song et al. | 313/495 |
| 2005/0258729 A1* | 11/2005 | Han et al. | 313/309 |
| 2006/0003401 A1* | 1/2006 | Lee et al. | 435/34 |
| 2006/0066217 A1* | 3/2006 | Son | 313/497 |

* cited by examiner

FIELD EMISSION DEVICE, DISPLAY ADOPTING THE SAME AND METHOD OF MANUFACTURING THE SAME

CLAIM OF PRIORITY

This application makes reference to, incorporates the same herein, and claims all benefits accruing under 35 U.S.C. § 119 from an application for FIELD EMISSION DEVICE, DISPLAY ADOPTING THE SAME AND METHOD OF MANUFACTURING THE SAME earlier filed in the Korean Intellectual Property Office on 22 Dec. 2003 and there duly assigned Serial No. 2003-94415.

BACKGROUND OF THE INVENTION

1. Technical Field

The present invention relates to a field emission device, a display adopting the same, and a method of manufacturing the same and, more particularly, to a field emission device which has improved focusing effect of electron beams, a display adopting the same, and a method of manufacturing the same.

2. Related Art

Display devices, which are the principal conventional information transmission media, have been typically used as monitors of PCs and TV receivers. Such display devices are largely classified into cathode ray tubes (CRTs) which use high-speed emission of hot electrons, and flat panel display devices which have been rapidly advancing. The flat panel display devices include a liquid crystal display (LCD), a plasma display panel (PDP), and a field emission display (FED).

In the field emission display, a strong electric field is formed between a field emitter and gate electrodes disposed on a cathode at a constant interval, so that electrons are emitted from the field emitter so as to impact on phosphors of an anode, thereby emitting light. The field emission display is a very thin display device, and is therefore attracting great attention in view of its thinness of several centimeters in overall thickness, wide viewing angle, low power consumption and low fabrication cost.

The field emission display utilizes substantially the same physical principle as the CRT. In other words, emissions from the cathode are accelerated so as to collide with the anode so that phosphors coated on the anode are excited so as to emit light of a particular color. Unlike the CRT, however, the field emission display uses a cold cathode material as an electron source. The field emission display includes a cathode formed on a substrate. In addition, a gate electrode is formed as an electron extracting electrode on an insulating layer. A field emitter is provided within a hole through which part of the cathode is exposed.

In the field emission display having the above-described structure, however, if the trajectories of electron beams are not controlled, a desired color cannot be exactly displayed at a given pixel. Therefore, there is a demand for an electron beam trajectory control technique which enables electrons emitted from the field emitter to be accurately transmitted to a desired pixel on an anode coated with a phosphor material.

A second insulating layer is additionally deposited over a gate electrode, and a focus gate electrode for controlling electron beam trajectories is formed thereon.

Overfocused electrons deviate from a target phosphor layer region and excite a phosphor layer in another region, which results in deterioration of color purity. This undesirable result is caused by inconstant protruding directions of a carbon nanotube (CNT) used as an electron source.

To avoid the above-described concerns, U.S. Pat. No. 5,920,151 discloses a field emission display (FED) having an imbedded focusing structure. However, it requires an outgassing process for exhausting volatile gas from an organic material formed on a focus gate electrode, i.e., polyimide, making the disclosed FED difficult to apply to a large-screen display field.

SUMMARY OF THE INVENTION

The present invention provides a field emission device which has improved focusing of electron beams, a display adopting the same, and a method of manufacturing the same. In an aspect of the present invention, there is provided a field emission device having a glass substrate, an emitter electrode formed on the glass substrate, a carbon nanotube (CNT) emitter formed on the emitter electrode, and a gate stack formed around the CNT emitter for extracting electron beams from the CNT emitter and focusing the extracted electron beams onto a given position. The gate stack comprises: a mask layer that covers the emitter electrode provided around the CNT emitter; a gate insulating layer formed on the mask layer to a predetermined height; a mirror electrode formed on an inclined plane of the gate insulating layer; a gate electrode formed on the gate insulating layer and spaced apart from the mirror electrode; and a focus gate insulating layer and a focus gate electrode sequentially formed on the gate electrode.

In another aspect of the present invention, there is further provided a field emission display device having a glass substrate, an emitter electrode formed on the glass substrate, a carbon nanotube (CNT) emitter formed on the emitter electrode, a gate stack formed around the CNT emitter for extracting electron beams from the CNT emitter and focusing the extracted electron beams onto a given position, a front panel formed above the gate stack and on which information is displayed, and a phosphor layer coated on a surface of the front panel facing the CNT emitter. The gate stack comprises: a mask layer that covers the emitter electrode provided around the CNT emitter; a gate insulating layer formed on the mask layer to a predetermined height; a mirror electrode formed on an inclined plane of the gate insulating layer; a gate electrode formed on the gate insulating layer and spaced apart from the mirror electrode; and a focus gate insulating layer and a focus gate electrode sequentially formed on the gate electrode.

In still another aspect of the present invention, there is further provided a method of manufacturing a field emission device having a glass substrate, a transparent electrode formed on the glass substrate, a carbon nanotube (CNT) emitter formed on the emitter electrode, and a gate stack formed around the CNT emitter for extracting electron beams from the CNT emitter and focusing the extracted electron beams onto a given position. The forming of the gate stack comprises: (1) forming a mask layer on the glass substrate so as to partially expose the transparent electrode through a via hole; (2) forming a gate insulating layer filling the via hole on the mask layer; (3) patterning the gate insulating layer around the via hole to expose the transparent electrode; (4) forming an electrode on the gate insulating layer around the via hole; (5) removing the electrode disposed at an edge area between an inclined plane and a top plane of the gate insulating layer; (6) sequentially forming the focus gate insulating layer and the focus gate electrode on the product resulting from step (5); and (7) patterning the focus gate electrode and the focus gate insulating layer around the via hole so as to expose the transparent electrode through the via hole.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
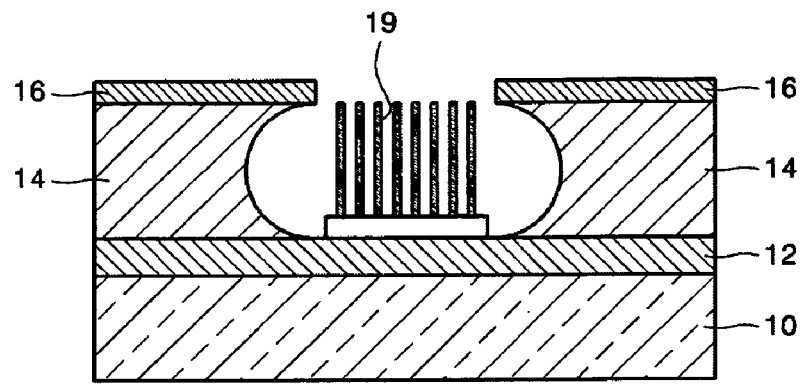
FIG. 1 is a schematic cross-sectional view of a field emission display (FED) device.

A field emission display device according to the present invention, a display device adopting the same, and a method of manufacturing the same will now be described more fully hereinafter with reference to the accompanying drawings, in which preferred embodiments of the invention are shown. In the drawings, the thickness of layers, regions, etc. are exaggerated for clarity.

FIG. 1 is a schematic diagram of a field emission display device. Referring to FIG. 1, the field emission display device includes a cathode 12 formed on a substrate 10. Also, a gate electrode 16 is formed as an electron extracting electrode on an insulating layer 14. A field emitter 19 is provided within a hole through which part of the cathode 12 is exposed.

In the field emission display device having the above-described structure, however, if trajectories of electron beams are not controlled, a desired color cannot be exactly displayed at a given pixel. Therefore, there is a demand for an electron beam trajectory control technique which enables electrons emitted from the field emitter 19 to be accurately transmitted to a desired pixel on an anode coated with a phosphor material.

Figure 2:
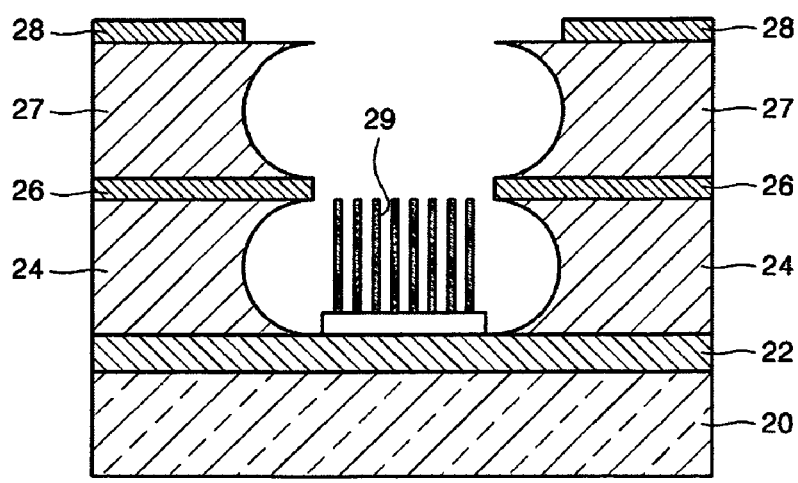
FIG. 2 is a schematic cross-sectional view of an FED having a focus gate electrode.

FIG. 2 shows an example of an electron source having a focus gate electrode.

Referring to FIG. 2, a second insulating layer 27 is additionally deposited over a gate electrode 26, and a focus gate electrode 28 for controlling electron beam trajectories is formed thereon. In FIG. 2, reference numerals 20, 22, 24, and 29 denote a substrate, a cathode, a first insulating layer, and a field emitter, respectively.

Figure 3:
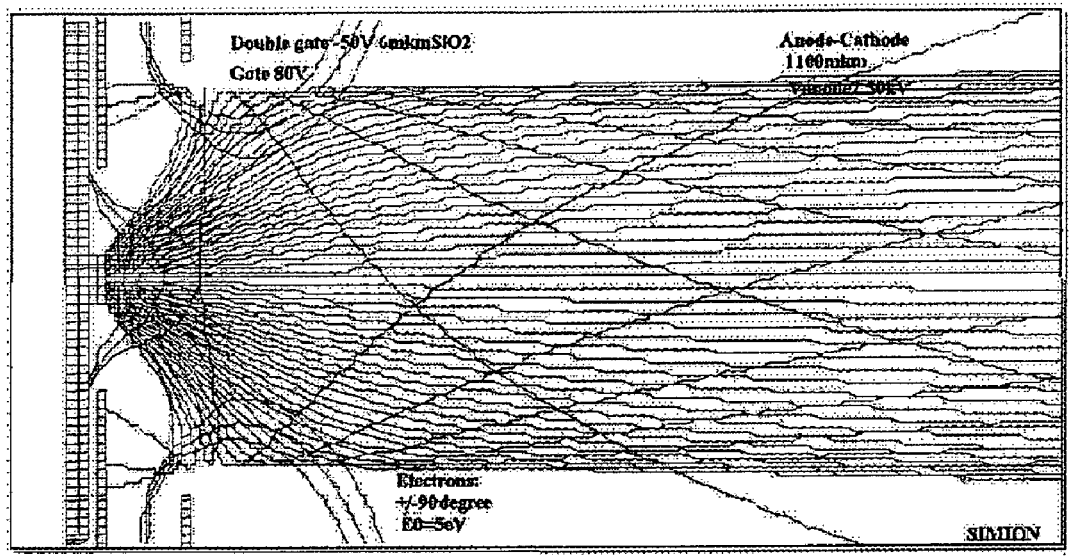
FIG. 3 shows the results of a computer simulation performed with respect to trajectories of electron beams emitted from emitters of the FED having the focus gate electrode.

FIG. 3 shows the results of a computer simulation performed with respect to trajectories of electron beams emitted from emitters of the FED having the focus gate electrode.

Figure 4:
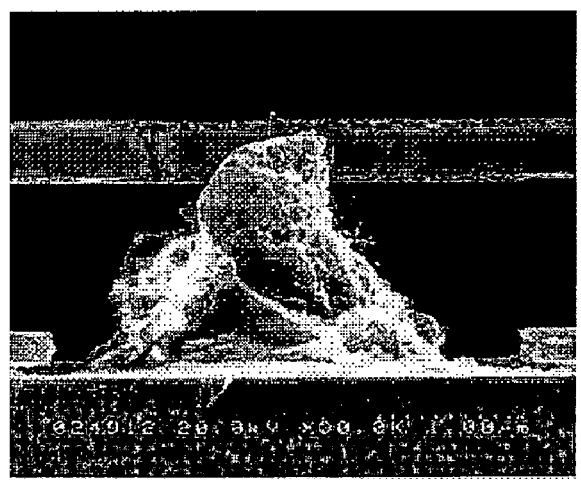
FIG. 4 is a scanning electron microscope (SEM) photo showing a general CNT emitter.

Referring to FIG. 3, overfocused electrons deviate from a target phosphor layer region and excite a phosphor layer in another region, which results in deterioration of color purity. This undesirable result is caused by inconstant protruding directions of a carbon nanotube (CNT) used as an electron source, as shown in FIG. 4.

Figure 5:
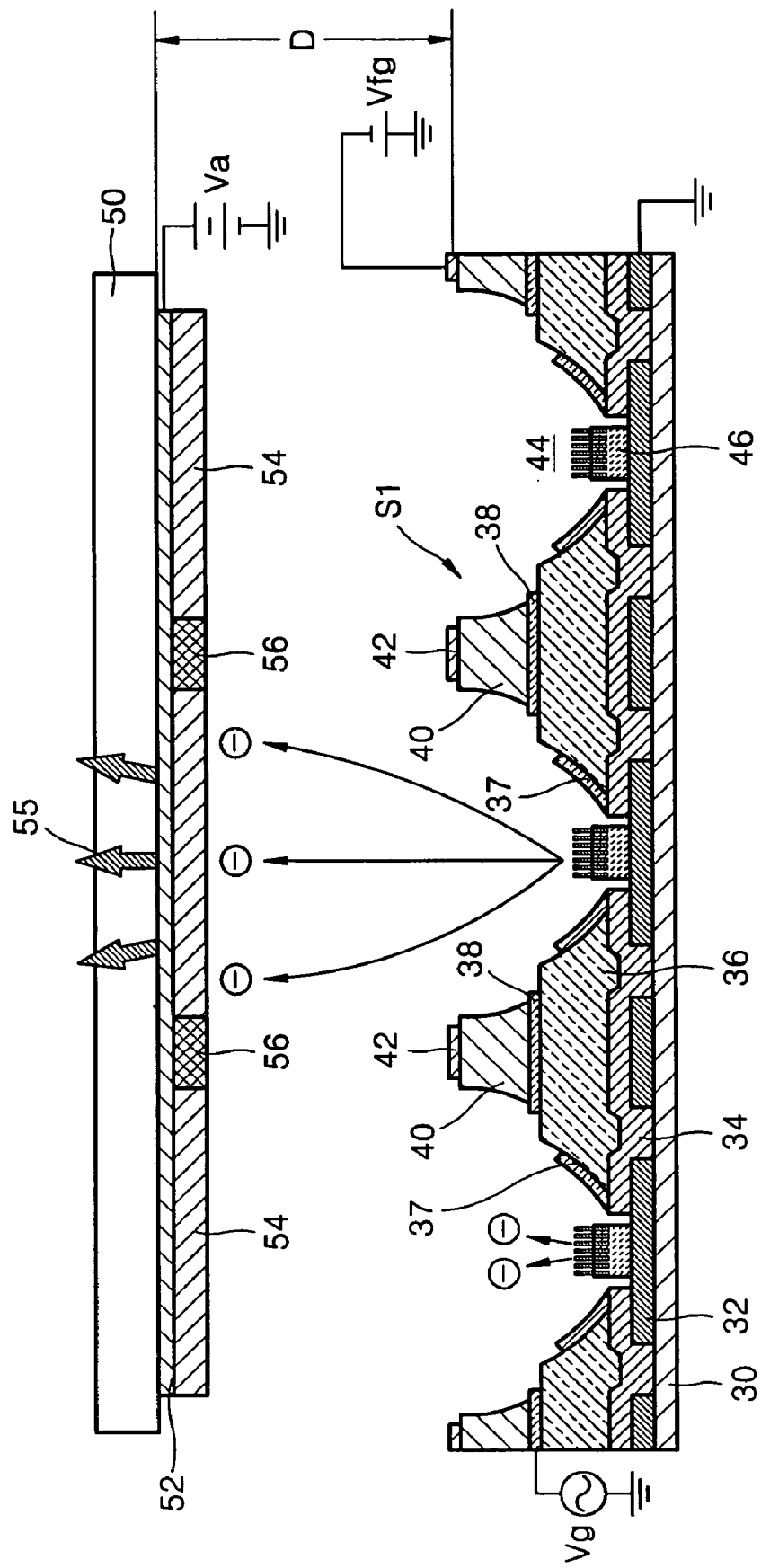
FIG. 5 is a partly cross-sectional view of a field emission display device according to an embodiment of the present invention.

FIG. 5 is a partly cross-sectional view of a field emission display device according to an embodiment of the present invention.

Referring to FIG. 5, an emitter electrode 32 is formed on a glass substrate 30. The emitter electrode 32 is preferably a transparent electrode made of indium tin oxide (ITO). A gate stack S1, which partially covers the emitter electrode 32 is formed on the glass substrate 30. A contact hole 44 is formed between the gate stacks S1 so as to expose the emitter electrode 32. A CNT emitter 46 is formed on the emitter electrode 32 exposed by the contact hole 44. Electrons are emitted from the CNT emitter 46. The CNT emitter 46 is in a non-contact state with respect to the gate stack S1. The gate stack S1 partially covers the transparent electrode 32, and includes a first mask layer 34 used as a mask for a back exposure, which will be described later. The first mask layer 34 is spaced apart from the CNT emitter 46. A gate insulating layer 36, a gate electrode 38, a focus gate insulating layer 40 and a focus gate electrode 42 are sequentially stacked on the first mask layer 34. An inclined plane of the gate insulating layer 36 is concavely formed, and a distance between the gate insulating layer 36 and the CNT emitter 46 gradually increases in a direction in which electrons travel. A concave mirror electrode 37 is formed on the inclined plane. A lower portion of the concave mirror electrode 37 is connected to the first mask layer 34. The respective layers and electrodes 36, 38, 40 and 42 are tapered upward, as shown in FIG. 5. Thus, the lateral surface of the gate stack S1 is in the shape of a stepped tilted surface.

Various elements of the gate stack S1 are patterned by a back exposure method using ultraviolet light in the manufacturing process of the CNT FED shown in FIG. 5, which will be described later. The first mask layer 34 is preferably a material layer which, in view of its optical properties, is transparent with respect to visible light while being opaque with respect to ultraviolet light. For example, an amorphous silicon layer may be used as the first mask layer 34.

An upper end of the concave mirror electrode 37 is spaced apart from the gate electrode 38, and a lower portion thereof is connected to the first mask layer 34. Therefore, when the first mask layer 34 is formed of amorphous silicon, a voltage applied to the emitter electrode 32 is transferred to the concave mirror electrode 37 through the mask layer 34. The concave mirror electrode 37 is preferably formed of the same material as the gate electrode 38, which will be described later.

The gate insulating layer 36 is provided for the establishment of electric isolation between the gate electrode 38 and the transparent electrode 32. The gate insulating layer 36 is made of an insulating material, e.g., silicon oxide ($SiO_x$), and the thickness thereof is usually in a range of about 4 to 10 µm. Here, the value of the subscript "X" is preferably smaller than 2 (X<2). The thickness of the gate insulating layer 36 may vary according to the formation method and material used.

The gate electrode 38 and the concave mirror electrode 37 are preferably formed of chrome having a thickness of about 0.25 µm. The gate electrode 38 and the concave mirror electrode 37 may be made of different material having different conductivity. In this case, the thicknesses of the gate electrode 38 and the concave mirror electrode 37 may not be 0.25 µm.

The focus gate insulating layer 40 electrically insulates the gate electrode 38 from the focus gate electrode 42. The focus gate insulating layer 40 may be silicon oxide ($SiO_x$) having a thickness not less than 2 µm, preferably 3 µm to 15 µm. Here, the subscript value "X" is preferably smaller than 2 (X<2).

The focus gate electrode 42 is preferably a chromium electrode having a predetermined thickness, e.g., approximately 0.25 µm. The focus gate electrode 42 can be made of a different material having conductivity. In this case, the thickness of the electrode may not be 0.25 µm.

The gate electrode 38 is used to extract electron beams from the CNT emitter 46. Accordingly, a predetermined AC gate voltage Vg, e.g., +80 V, may be applied to the gate electrode 38.

Figure 37:
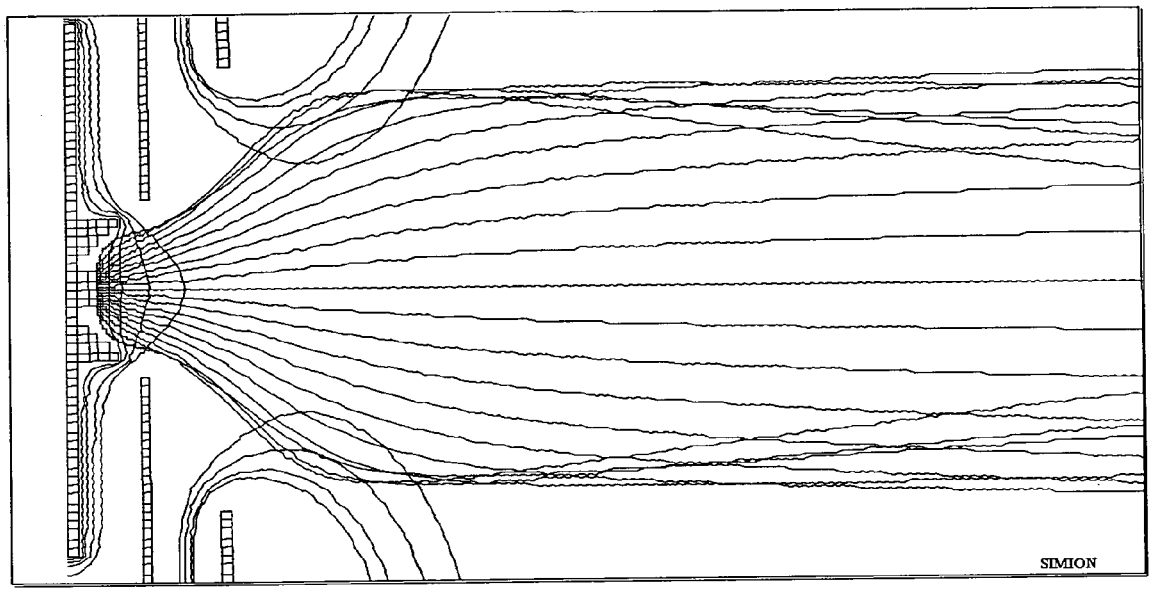
FIG. 37 shows the results of a computer simulation performed with respect to trajectories of electron beams emitted from emitters of the FED according to the present invention.

Meanwhile, the concave mirror electrode 37 is electrically connected to the emitter electrode 32 so as to be used in focusing the electrons emitted from the CNT emitter 46 at an initial stage. The focusing performed by the concave mirror electrode 37 is shown in FIG. 37.

Also, the focus gate electrode 42 collects the electron beams emitted from the CNT emitter 46 so as to reach a given position of the phosphor layer 54. To this end, a focus gate voltage $V_{fg}$ having the same polarity as, and a lower absolute value than, gate voltage Vg, e.g., approximately −10 V, is applied to the focus gate electrode 42.

Referring to FIG. 5, a front panel 50 is provided in the upward direction by a predetermine distance D, e.g., 1.1 mm, and is spaced apart from the focus gate electrode 42 of the gate stack S1. A variety of types of information is displayed on the front panel 50. An anode 52 is formed on the bottom surface of the front panel 50 facing the gate stack S1, while a phosphor layer 54 is formed on a portion of the anode 52, and a black matrix 56 for preventing optical crosstalk is formed on the remaining portion. The phosphor layer 54 has phosphors which are excited by the electron beams so as to emit light 55 of red (R), green (G) and blue (B) uniformly distributed. A DC voltage Va is applied to the anode 52.

In FIG. 5, spacers are provided between the front panel 50 and gate stacks S1, but the spacers are not shown for brevity.

A method of manufacturing a CNT FED according to an embodiment of the present invention will now be described. Specifically, a description of forming the gate stack S1 will follow.

First, steps of stacking and etching material layers applied to a process of forming a gate insulating layer 36 and/or a focus gate insulating layer 40 included in the gate stack S1 will be described in detail with reference to FIGS. 6 thru 14.

Figure 6:
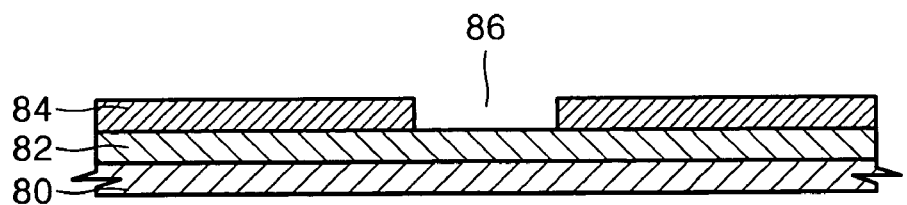
FIGS. 6 thru 14 are cross-sectional views showing the sequential steps of stacking and etching oxide layers applied to a process of forming a gate insulating layer included in a gate stack of the field emission display device shown in FIG. 5.

Referring first to FIG. 6, a first electrode 82 is formed on a substrate 80. The substrate 80 may correspond to the glass substrate 30 of the CNT FED (to be referred to as an FED according to the present invention) shown in FIG. 2. The first electrode 82 corresponds to the ITO transparent electrode 32 of the FED according to the present invention.

A second mask layer 84 is formed on the first electrode 82. Then, via hole 86, through which the first electrode 82 is exposed, is formed in the second mask layer 84. The second mask layer 84 is a material layer which is transparent to visible light and opaque to UV light, e.g., an amorphous silicon layer. Therefore, the second mask layer 84 corresponds to the first mask layer 34 of the FED according to the present invention.

Figure 7:
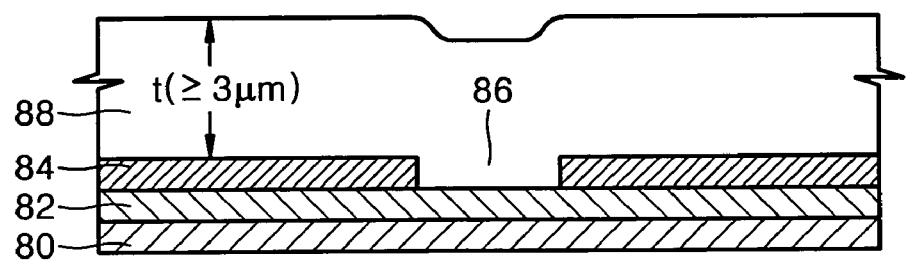

Referring to FIG. 7, an insulating layer 88 is formed on the second mask layer 84 to a predetermined thickness (t) using silicon oxide ($SiO_2$) to fill the hole 86. The insulating layer 88 is formed to a thickness of 2 µm or greater, preferably 3 to 15 µm, most preferably 6 to 15 µm. The insulating layer 88 may be formed by a plasma enhanced chemical vapor deposition (PECVD) technique using radio frequency (RF) power. However, the technique employed may vary according to the thickness of the insulating layer 88. For example, when the insulating layer 88 is formed so as to be relatively thin within the above thickness range, sputtering can be employed. When the insulating layer 88 is formed so as to be relatively thick within the above thickness range, electric plating or thermal evaporation can be employed.

Detailed processing conditions for forming the insulating layer 88 using silicon oxide ($SiO_x$) by the PECVD technique are as follows.

During formation of silicon oxide ($SiO_x$), the substrate 80 is maintained at a temperature in a range of about 250° C. to about 450° C., preferably at approximately 340° C. RF power is maintained in a range of 100 to 300 W, preferably about 160 W. The pressure of a reaction chamber is maintained in a range of 600 to 1,200 mTorr, preferably about 900 mTorr. The flow rate of silane ($SiH_4$) as a source gas is preferably maintained at such a level that the deposition rate is greater than 400 nm/min. For example, the flow rate of the silane is maintained at 50 to 700 sccm, preferably approximately 300 sccm, which is much higher than that used to form general silicon oxide ($SiO_2$), that is, approximately 15 sccm. Another source gas, nitric acid ($N_2O$), is preferably supplied at a flow rate in a range of 700 to 4,500 sccm, preferably 1,000 to 3,000 sccm.

Figure 15:
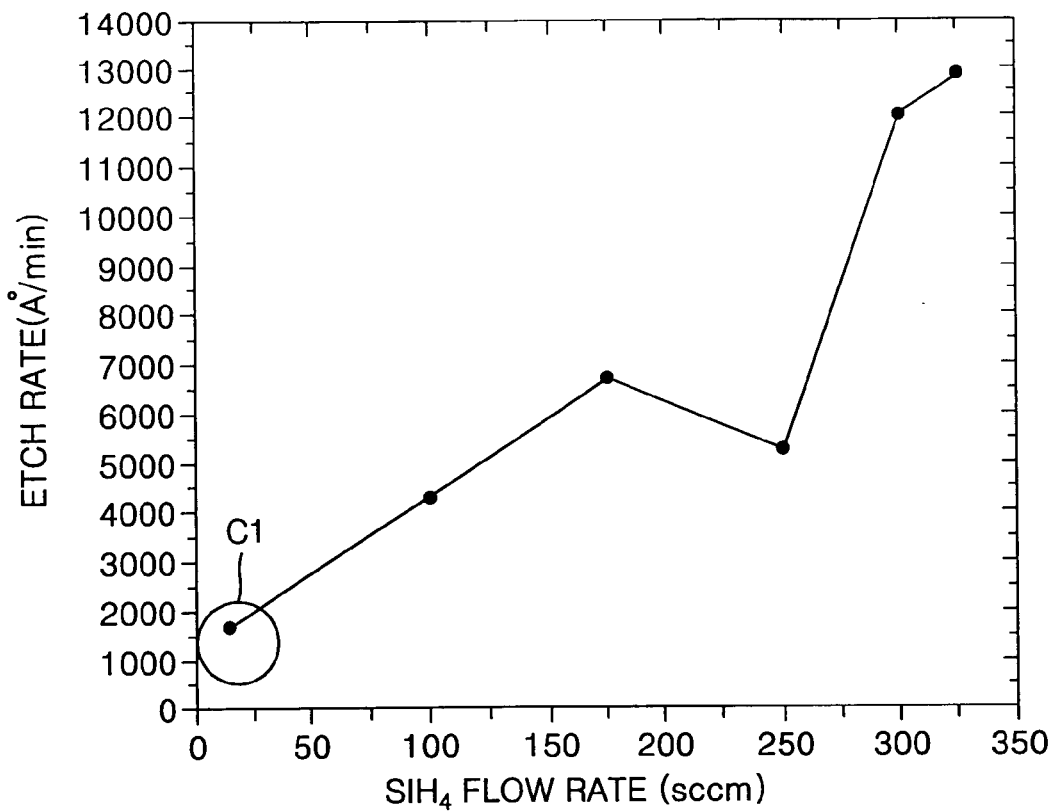
FIG. 15 is a graph showing the etch rate depending on a flow rate of silane (SiH4) contained in a focus gate insulating layer included in the gate stack of the field emission display device shown in FIG. 5.

The flow rate of silane defined above can also be applied to an etching process of silicon oxide ($SiO_x$) by the PECVD technique. In this case, as shown in FIG. 15, for the silane flow rate range defined above, the etch rate of silicon oxide ($SiO_x$) is much higher than for of the conventional case (see C1 in FIG. 15). During etching, the silane flow rate is preferably maintained at such a level that the etch rate of the silicon oxide ($SiO_x$) is greater than 100 nm/min.

Figure 16:
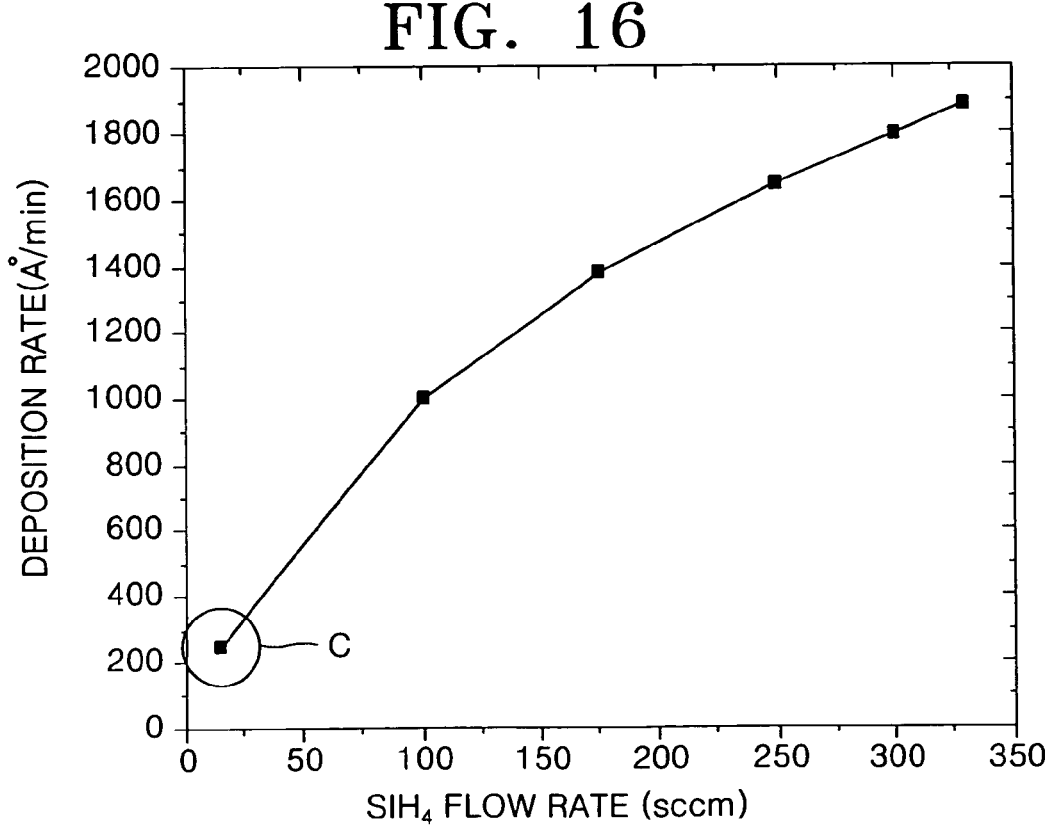
FIG. 16 is a graph showing a deposition rate depending on a flow rate of silane (SiH4) contained in a focus gate insulating layer included in the gate stacks of the field emission display device shown in FIG. 5.

When silicon oxide ($SiO_x$) is formed under the above-described processing conditions, it can be formed to a thickness within the thickness range defined above. Thus, better step coverage can be attained than in the prior art. According to the present invention, as shown in FIG. 16, the deposition rate (Å/min) is much higher than that of the prior art (see C in FIG. 16).

Figure 8:
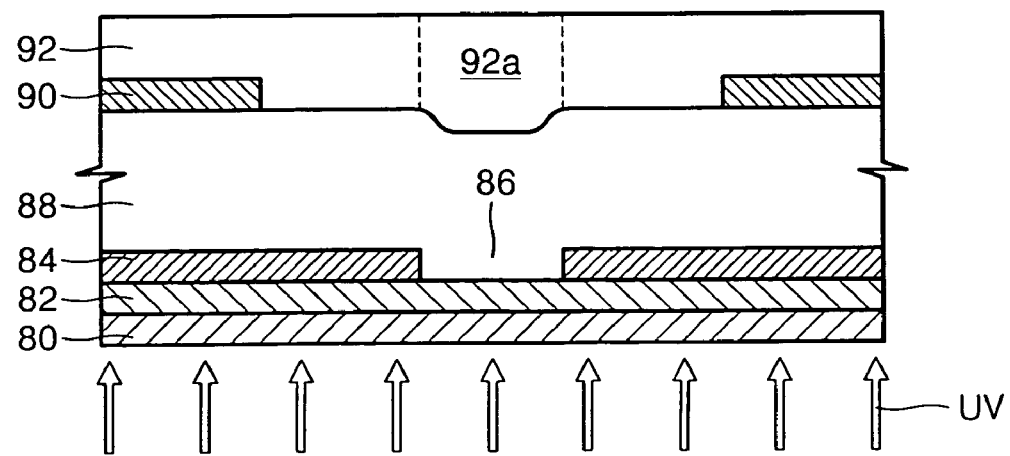

Referring to FIG. 8, a second electrode 90 is formed on the insulating layer 88. The second electrode 90 can be a chrome electrode. The second electrode 90 may correspond to the focus gate electrode 42 included in the gate stack S1 of the FED according to the present invention. A first photoresist layer 92 covering the second electrode 90 is formed on the insulating layer 88. The first photoresist layer 92 is preferably formed of a positive photoresist material. After forming the first photoresist layer 92, UV light is irradiated upward to the substrate 80, which is referred to as back exposure. Due to a UV masking property of the mask layer 84, a region of the mask layer 84, other than via hole 86 is not exposed to UV light during the back exposure. The UV light irradiated through the via hole 86 passes through the insulating layer 88, and a region 92a (to be referred to hereinafter as an exposed area) corresponding to the via hole 86 of the first photoresist layer 92 is exposed to the UV light. Thereafter, a developing process is performed. The exposed area 92a of the first photoresist layer 92 is removed during the developing process. Then, a predetermined baking process is performed.

Figure 9:
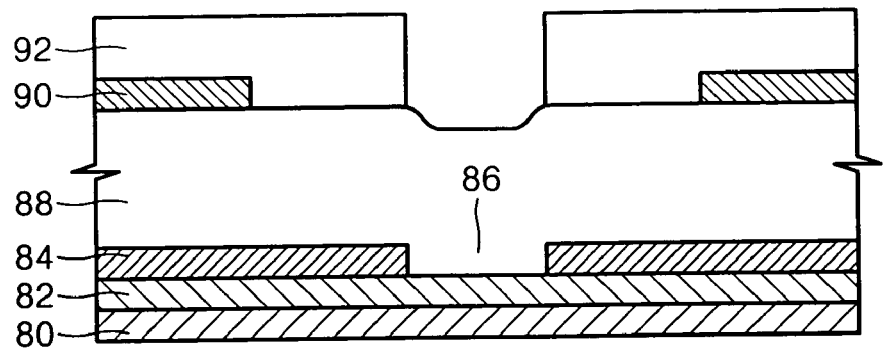

FIG. 9 shows a product resulting from the developing process and the baking process. As shown in FIG. 9, the insulating layer 88 is exposed through a portion created by removing the exposed area 92a.

Figure 10:
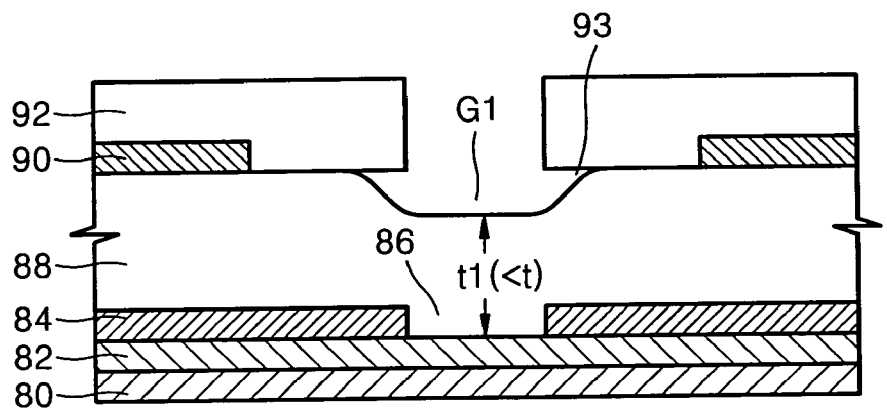

Referring to FIG. 10, the insulating layer 88 is primarily etched using the first photoresist layer 92 as an etch mask that partially exposes the insulating layer 88. The primary etching is carried out by a wet etching process using a predetermined etchant, and it is carried out for a predetermined time. A first groove G1 having a predetermined depth is formed at the exposed portion of the insulating layer 88 by the primary etching process. A thickness t1 of a portion where the first groove G1 of the insulating layer 88 is formed is smaller than a thickness t of a portion of the insulating layer 88 which is not affected by the primary etching. The first groove G1 extends to a lower portion of the first photoresist layer 92 due to an isotropic feature of wet etching. Accordingly, a first undercut 93 is formed under the first photoresist layer 92. After the primary etching, the first photoresist layer 92 is removed.

Figure 11:
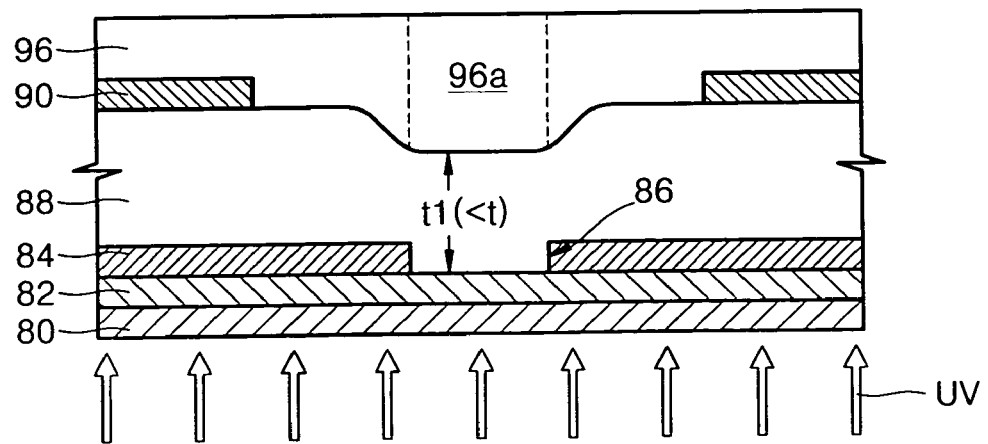

Referring to FIG. 11, after removal of the first photoresist layer 92, a second photoresist layer 96 covering the second electrode 90 is formed on the insulating layer 88 having the first groove G1 formed therein. The second photoresist layer 96 is formed of a positive photoresist material as the first photoresist layer 92 was. After formation of the second photoresist layer 96, secondary back exposure is performed. During the secondary back exposure, a region 96a corresponding to the hole 86 of the second photoresist layer 96 is exposed. Thereafter, a developing process is performed to remove the exposed area 96a, followed by baking the resultant structure.

Figure 12:
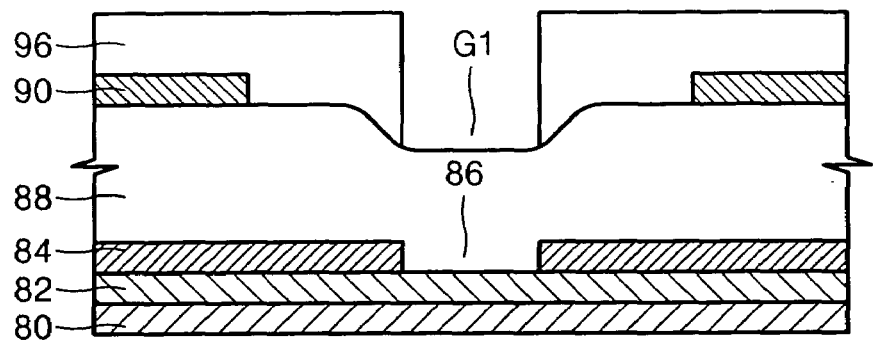
Figure 13:
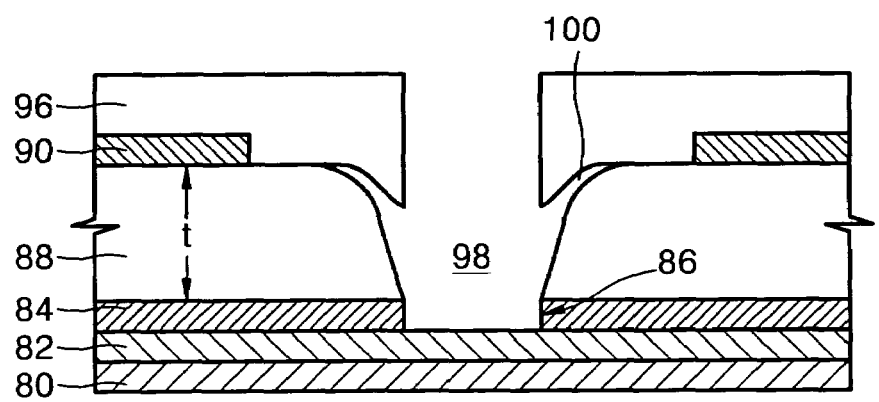

FIG. 12 shows a structure produced after baking the second photoresist layer 96. The first groove G1 is partially exposed through a portion created by removing the exposed area 96a of the second photoresist layer 96. In this state, the insulating layer 88 having the first groove G1 is secondarily etched using the second photoresist layer 96 as an etch mask. The secondary etching is a wet etching process using a predetermined etchant. The secondary etching is carried out until the first electrode 82 is exposed, as shown in FIG. 13. During the secondary etching, a via hole 98, through which a predetermined region of the first electrode 82 is exposed, is formed in the insulating layer 88. The via hole 98 extends to a lower portion of the second photoresist layer 96 due to wet etching. As a result, a second undercut 100 is formed under the second photoresist layer 96. After the secondary etching, the second photoresist layer 96 is ashed and stripped so as to be removed. Then, a predetermined washing step is performed, followed by drying.

Figure 14:
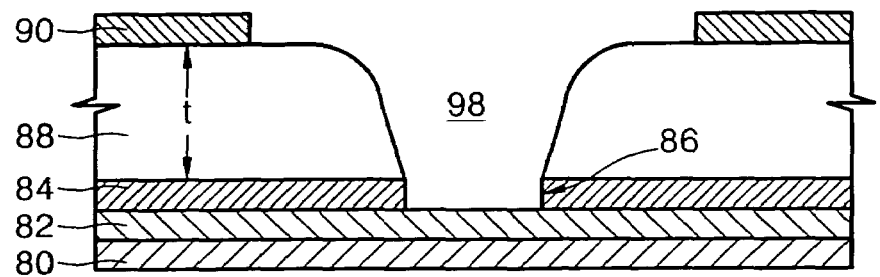

FIG. 14 shows a product resulting from the washing and drying. Referring to FIG. 14, the via hole 98 exposing the first electrode 82 is formed in the insulating layer 88.

Alternatively, instead of using back exposure, front exposure may be employed to etch the insulating layer 88. That is, UV light is irradiated downward into the photoresist layer, as is illustrated in FIG. 17.

Figure 17:
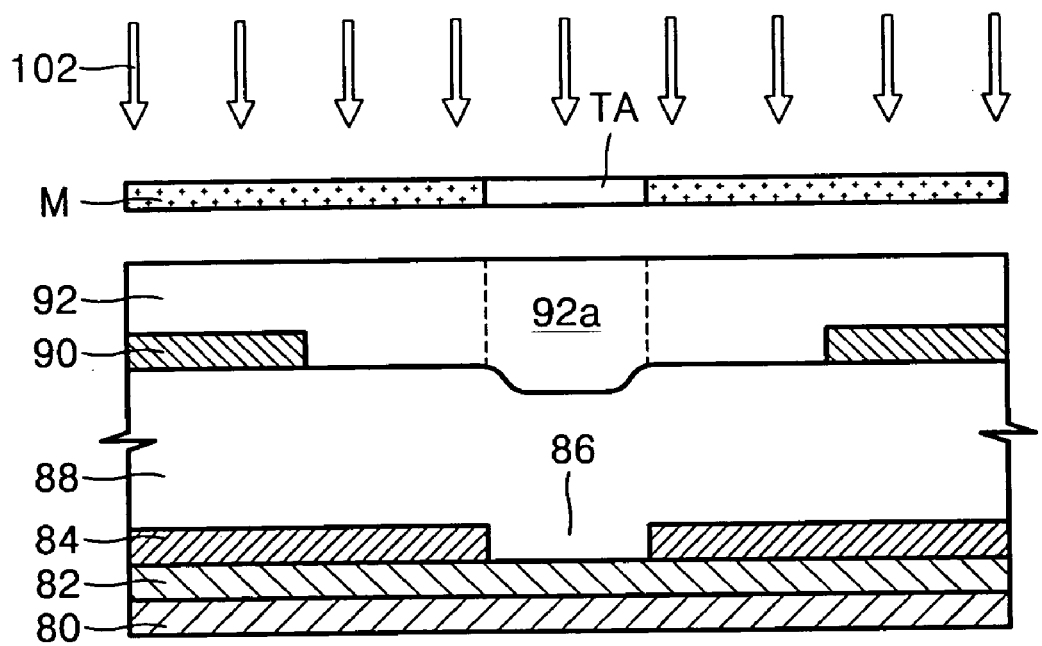
FIG. 17 is a cross-sectional view showing a method of exposing a photoresist layer different from an exposing method for stacking and etching oxide layers shown in FIGS. 6 thru 14.

In detail, referring to FIG. 17, a mask M is placed above at a position displaced from the first photoresist layer 92 by a given gap, the mask M having a transmission aperture TA only at a location corresponding to the hole 86 and shielding the remaining region. Subsequently, the light 102 is irradiated downward into the mask M. Some of the light 102 irradiated into the mask M is irradiated into the first photoresist layer 92 through the transmission aperture TA formed in the mask M. Accordingly, a predetermined region 92a of the first photoresist layer 92 is exposed. Then, the mask M is removed. The developing, washing and baking processes of the first photoresist layer 92, and the wet etching using the first photoresist layer 92 as an etch mask, are the same as described above.

A method of manufacturing a CNT FED shown in FIG. 5, to which the above-described depositing and etching processes of the insulating layer 88 are applied, will now be described.

Figure 18:
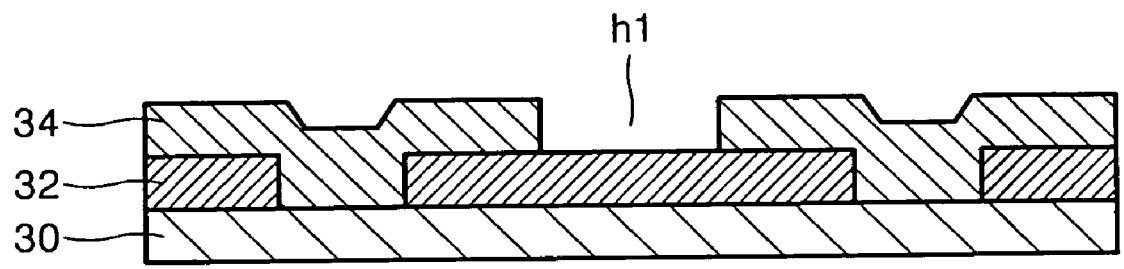
FIGS. 18 thru 32 are cross-sectional views showing the sequential steps of forming a gate stack and a carbon nanotube emitter in the method for manufacturing a field emission display device shown in FIG. 5.

Referring to FIG. 18, a transparent electrode 32 is formed on a glass substrate 30. The transparent electrode 32 is preferably an ITO electrode, but another equivalent electrode may also be used. A first mask layer 34 for back exposure is formed on the glass substrate 30 so as to cover the transparent electrode 32. The first mask layer 34 is preferably a material layer which is transparent with respect to visible light while being opaque with respect to UV light. For example, an amorphous silicon layer may be used as the first mask layer 34. A first via hole h1, through which the transparent electrode 32 is partially exposed, is formed in the first mask layer 34.

Figure 19:
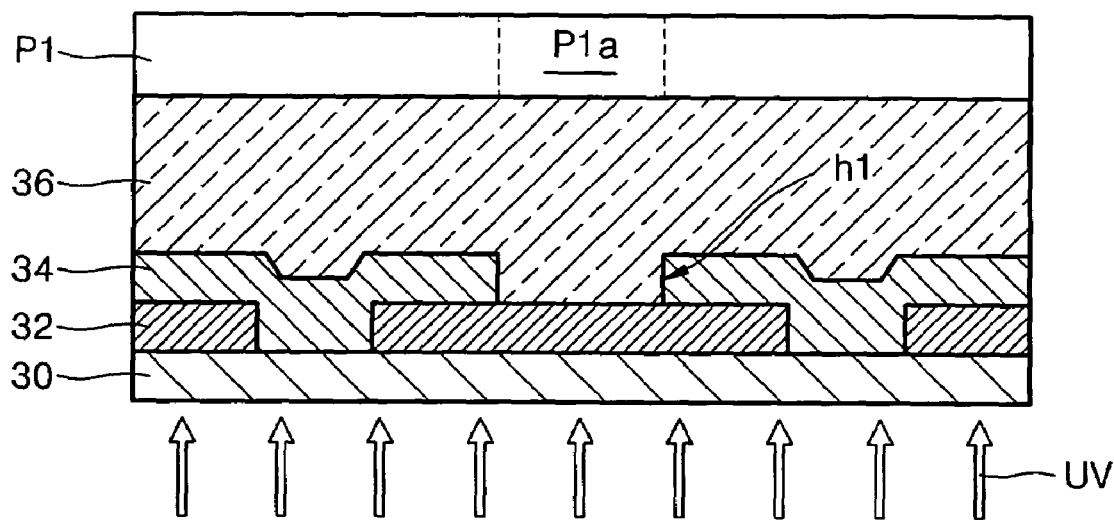

Referring to FIG. 19, a gate insulating layer 36 filling the first via hole h1 is formed on the first mask layer 34. The gate insulating layer 36 is formed of silicon oxide to a thickness of about 4 to 10 μm. The gate insulating layer 36 is formed by means of the formation method of the insulating layer 88 shown in FIGS. 6 thru 14. A first photoresist layer P1 is coated on the gate insulating layer 36. Then, UV light is irradiated toward a bottom surface of the glass substrate 30, which is referred to as back exposure. The UV light is incident on the first photoresist layer P1 via the transparent electrode 32, the first via hole h1, and the gate insulating layer 36. The UV light incident on a portion other than the first via hole h1 is masked by the first mask layer 34. Thus, only a portion P1a of the first photoresist layer P1 positioned above the first via hole h1 is exposed to the UV light. The exposed portion P1a is removed by a developing process. Thereafter, a predetermined baking process is performed.

Figure 20:
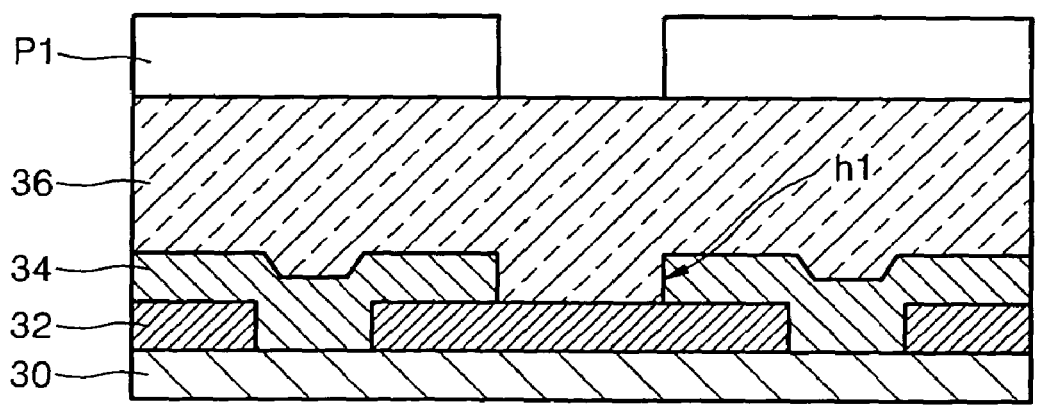

FIG. 20 shows a product resulting from the developing process and the baking process. The gate insulating layer 36 is exposed through a removed portion P1a.

Figure 21:
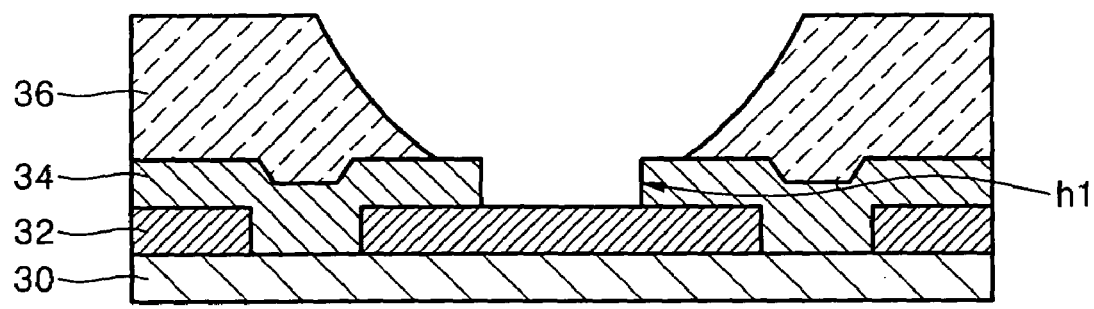

Subsequently, the gate insulating layer 36 is wet etched using the first photoresist layer P1 as an etch mask that partially exposes the gate insulating layer 36. The wet etching process is carried out continuously for a predetermined time so as to expose the electrode 32. Next, the first photoresist layer P1 is removed (see FIG. 21).

Figure 22:
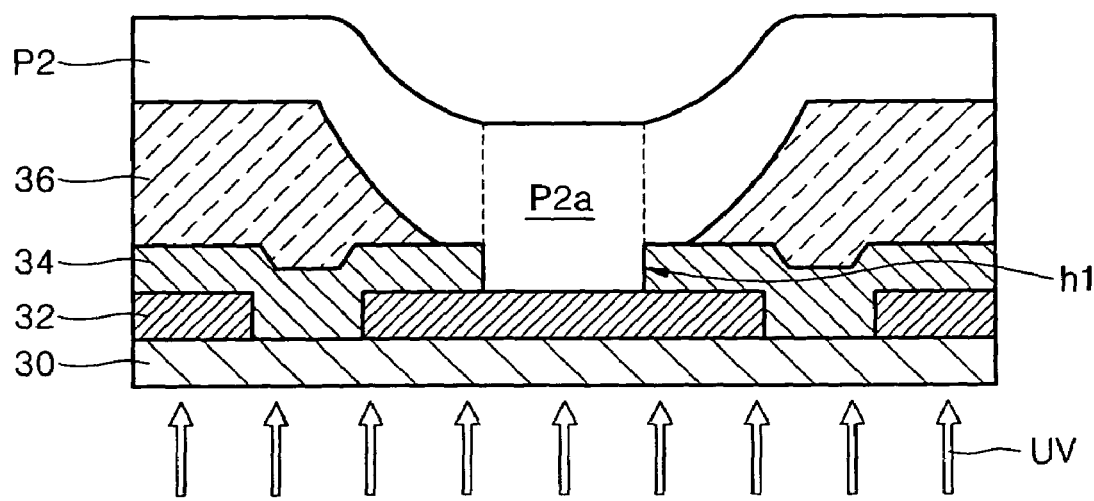

Referring to FIG. 22, after removing the first photoresist layer P1, a second photoresist layer P2 covering the first via hole h1 is formed on the gate insulating layer 36. The second photoresist layer P2 is preferably formed of a positive photoresist material. Subsequently, back exposure is performed, that is, UV light is irradiated into the bottom surface of the glass substrate 30. Reference mark P2a denotes an exposed area produced by back exposure.

Figure 35:
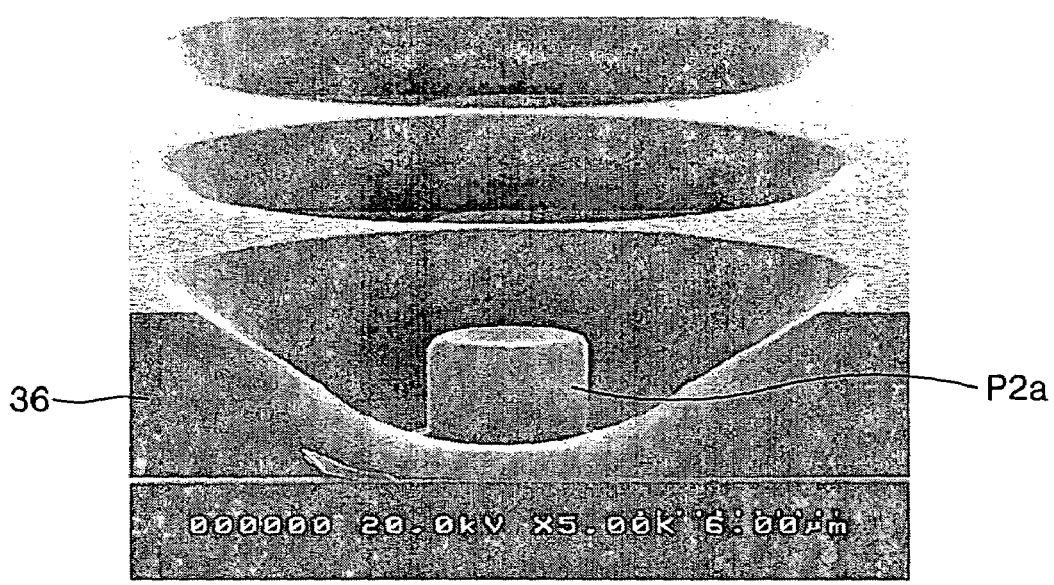
FIG. 35 is an SEM photo illustrating that a patterned photoresist layer is formed inside surrounded by a gate insulating layer.

Thereafter, a developing process is performed to remove the second photoresist layer P2 other than the exposed area P2a. FIG. 35 is an SEM photo illustrating the exposed area P2a formed inside the gate insulating layer 36.

Figure 23:
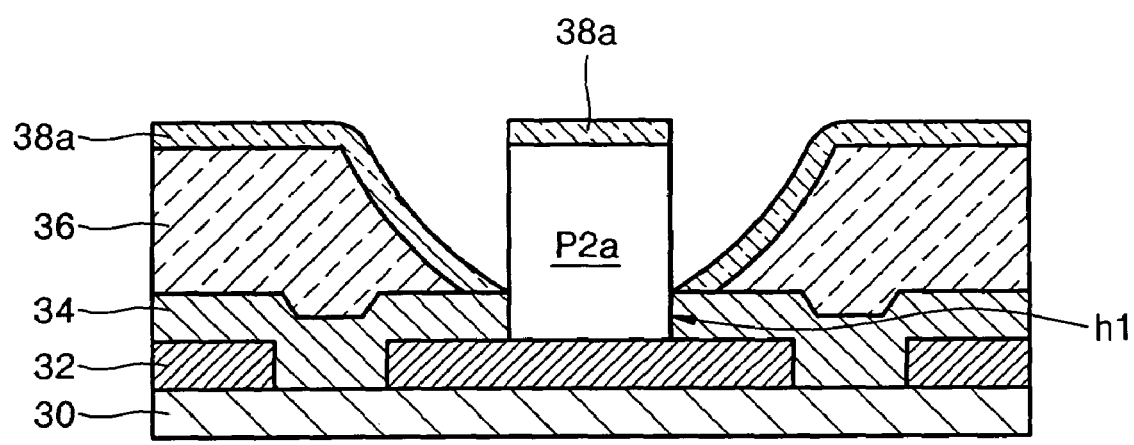

Referring to FIG. 23, an electrode 38a is formed on the gate insulating layer 36 by means of an electron beam deposition technique. Chrome, which is a conductive material, is preferably used as a source material for the electrode 38a.

Figure 24:
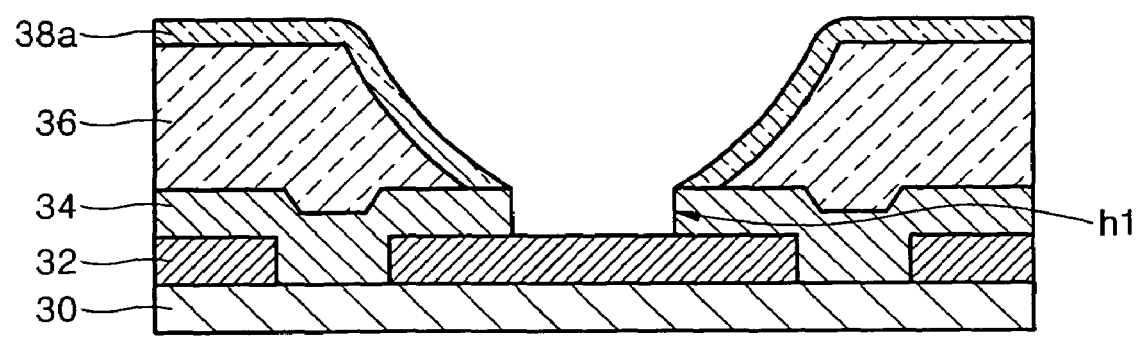
Figure 36:
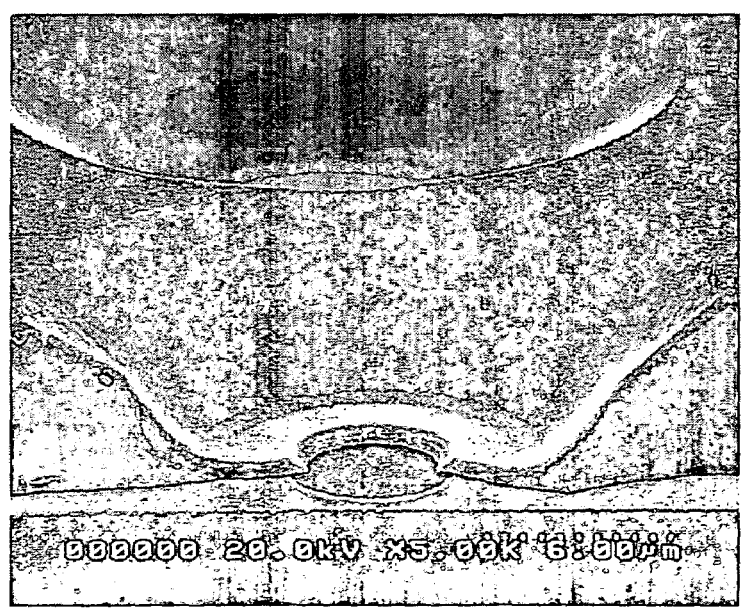
FIG. 36 is an SEM photo of the photoresist layer resulting from performance of a lift-off process.

Referring to FIG. 24, when the second photoresist layer P2 of the exposed area P2a is lifted off, the transparent electrode 32 is exposed. FIG. 36 is an SEM photo of the photoresist layer resulting from performance of the lift-off process.

Figure 25:
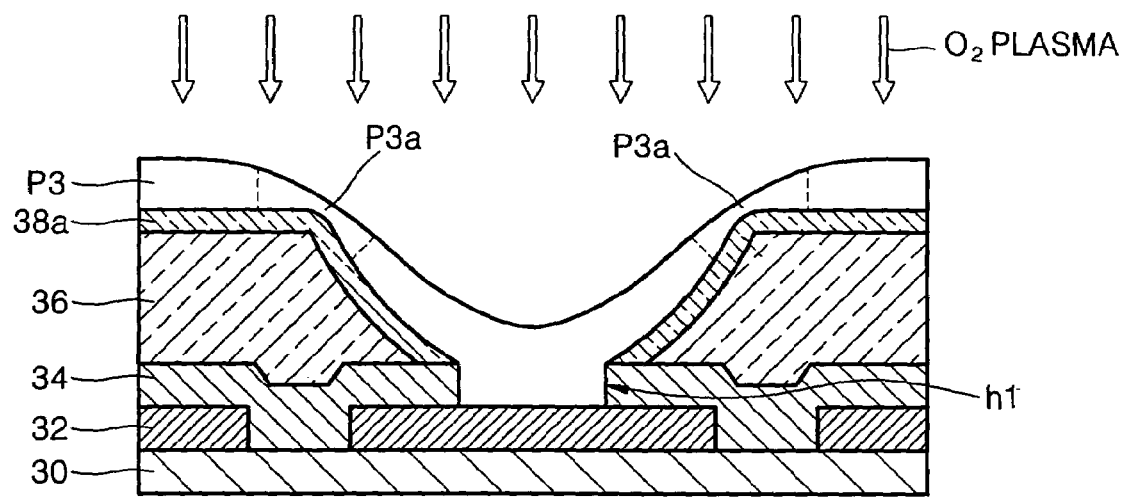

Referring to FIG. 25, a third photoresist layer P3 filling the exposed transparent electrode 32 is coated on the electrode 38a, and the third photoresist layer P3 is hard baked. The hard baked third photoresist layer P3 becomes thinner at an edge area P3a corresponding to a boundary between the inclined plane and the horizontal plane of the electrode 38a. Then, if the third photoresist layer P3 is uniformly etched by an $O_2$ plasma process, an electrode is exposed at the thin edge area P3a.

Figure 26:
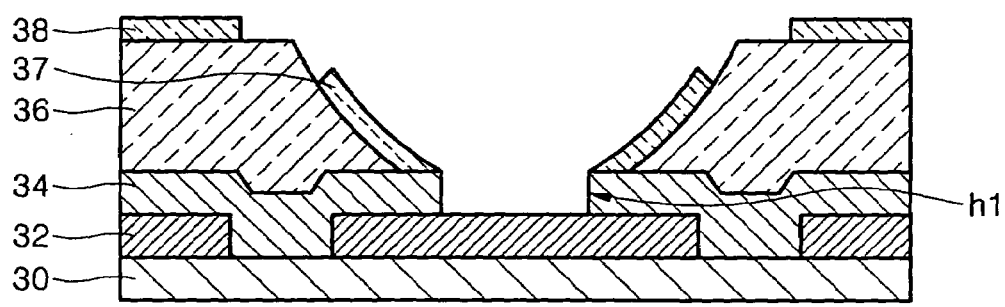

Next, the exposed electrode 38a is etched through the exposed edge area P3a using a predetermined etchant, and the electrode 38a is divided into two separate electrodes 37 and 38. Specifically, an electrode formed on the gate insulating layer 36 is gate electrode 38, and a new electrode 37 is formed on the inclined plane of the gate insulating layer 36. The newly formed electrode 37 is a concave mirror electrode which is electrically connected to the mask layer 34 disposed thereunder and to the transparent electrode 32. FIG. 26 is a resultant product created by removing the third photoresist layer P3.

Figure 27:
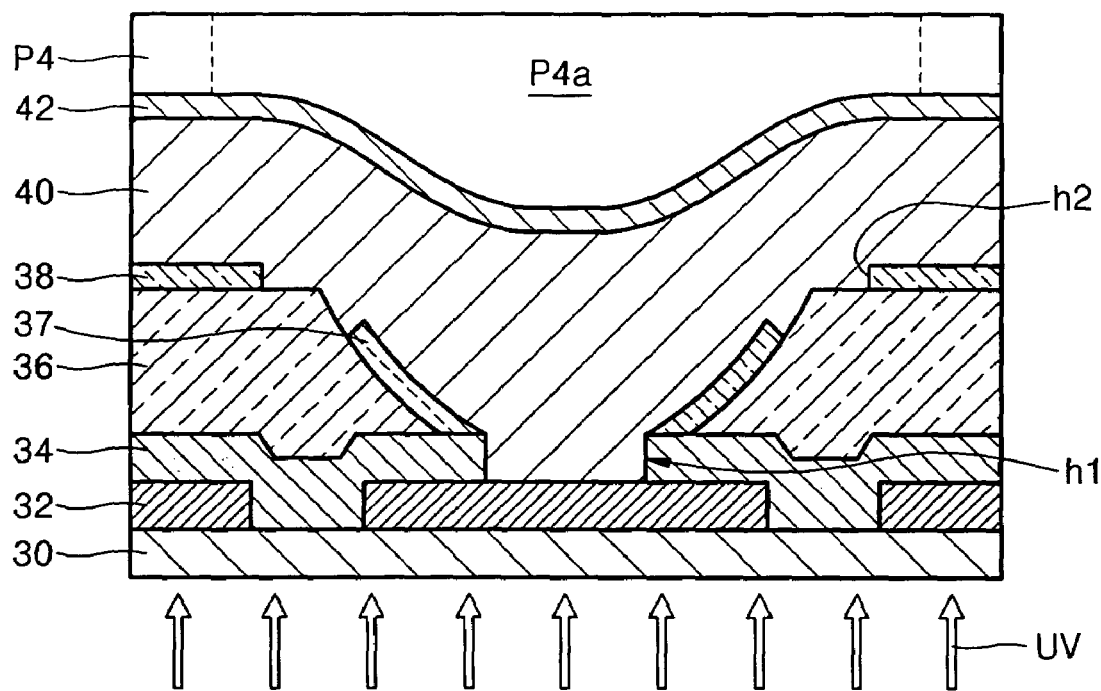

Referring to FIG. 27, the focus gate insulating layer 40 covering the mirror electrode 37 and the first via hole h1 is formed on the gate insulating layer 36 to a predetermined thickness. The focus gate insulating layer 40 is formed by the same formation method used to form the insulating layer 88 as shown in FIGS. 6 thru 14. Chrome is sputtered on the focus gate insulating layer 40 to form the focus gate electrode 42. A fourth photoresist layer P4 is coated on the focus gate electrode 42. Then, UV light is irradiated toward a bottom surface of the glass substrate 30, that is, back exposure is performed. Overetching is performed to make an exposed area P4a of the fourth photoresist layer P4 wider than a hole h2 of the gate electrode 38. The exposed area P4a is then removed by a developing process.

Next, the focus gate electrode 42 is partially exposed through a portion created by removing the exposed area P4a.

Figure 28:
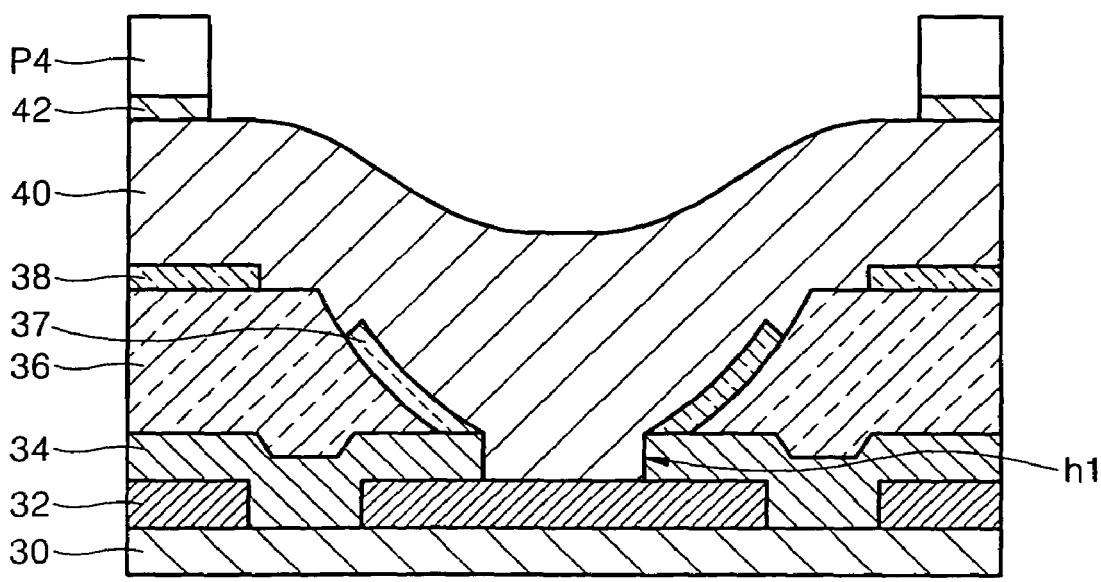

Then, the exposed portion of the focus gate electrode 42 is wet etched using the fourth photoresist layer P4 as an etch mask (see FIG. 28). Thereafter, the fourth photoresist layer P4 is removed.

Figure 29:
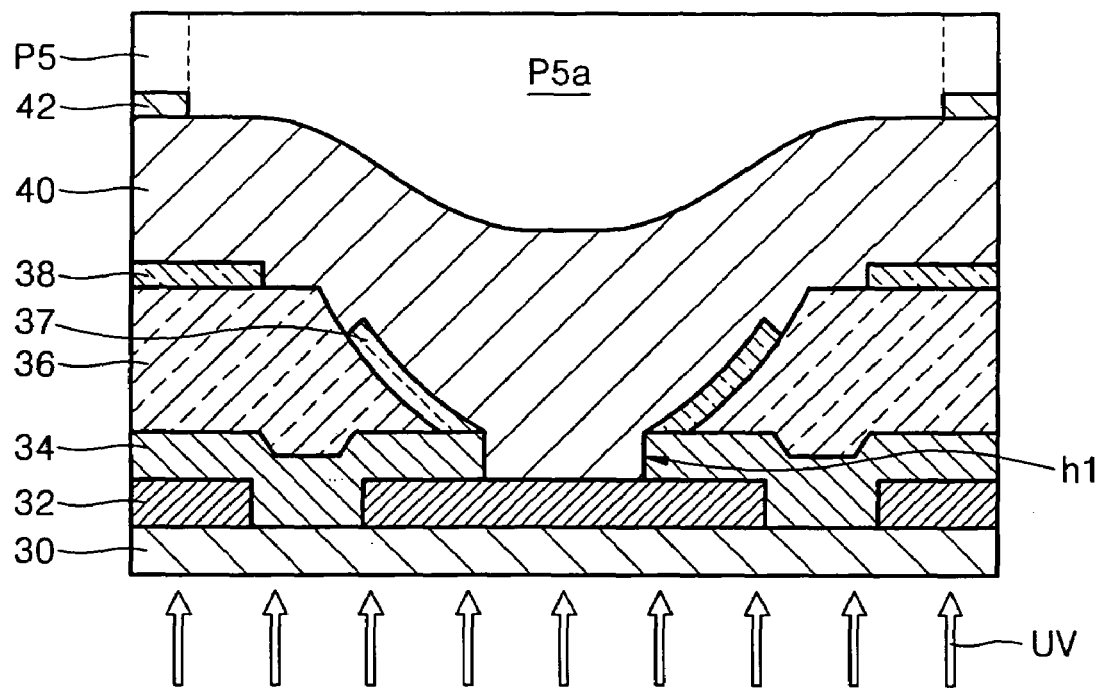

Referring to FIG. 29, a fifth photoresist layer P5 is coated on the focus gate insulating layer 40, and back exposure is performed to form an exposed area P5a. Then, the fifth photoresist layer P5 is developed. The focus gate insulating layer 40 is partially etched to expose the transparent electrode 32 through the first via hole h using the patterned fifth photoresist layer P5 as a mask.

Figure 30:
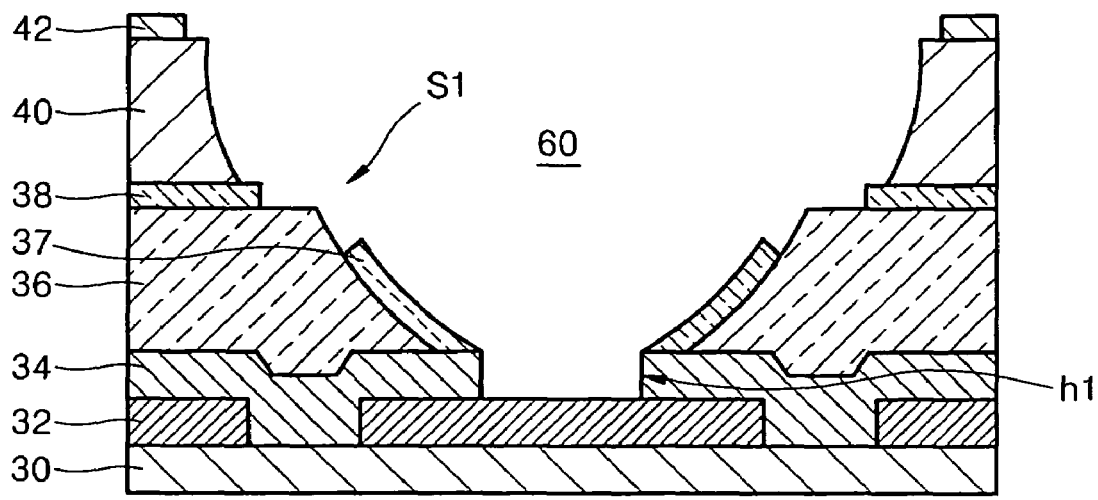

FIG. 30 shows the product created after removal of the fifth photoresist layer P5. Then, a hole 60, through which at least the transparent electrode 32 is exposed, is formed in the gate stack S1 consisting of the first mask layer 34, the gate insulating layer 36, the gate electrode 38, the focus gate insulating layer 40, and the focus gate electrode 42. The hole 60 corresponds to the contact hole 44 shown in FIG. 5.

Figure 31:
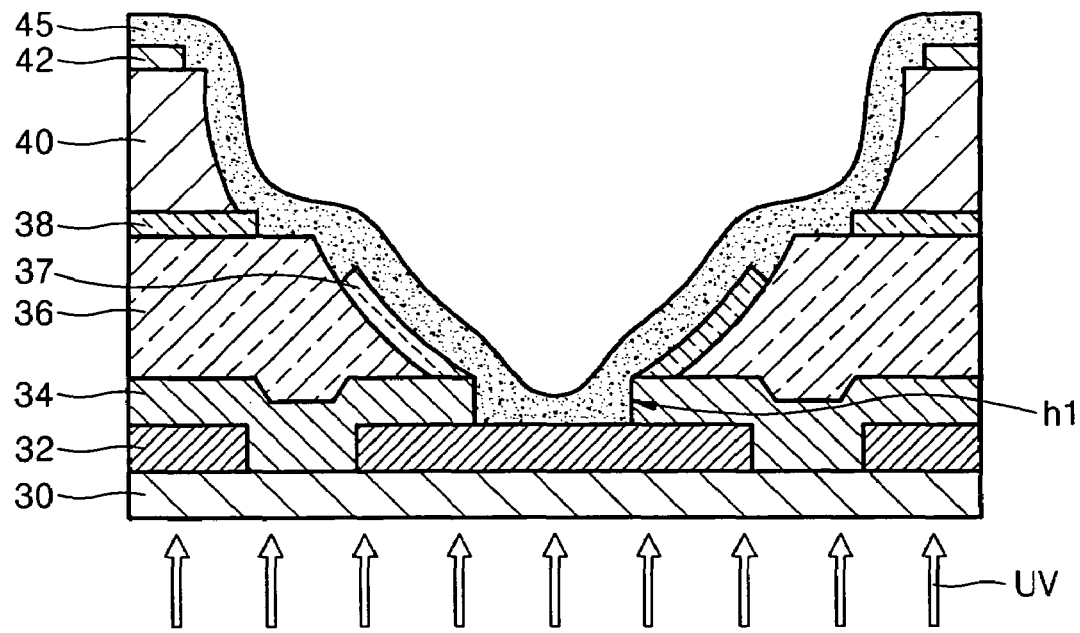
Figure 32:
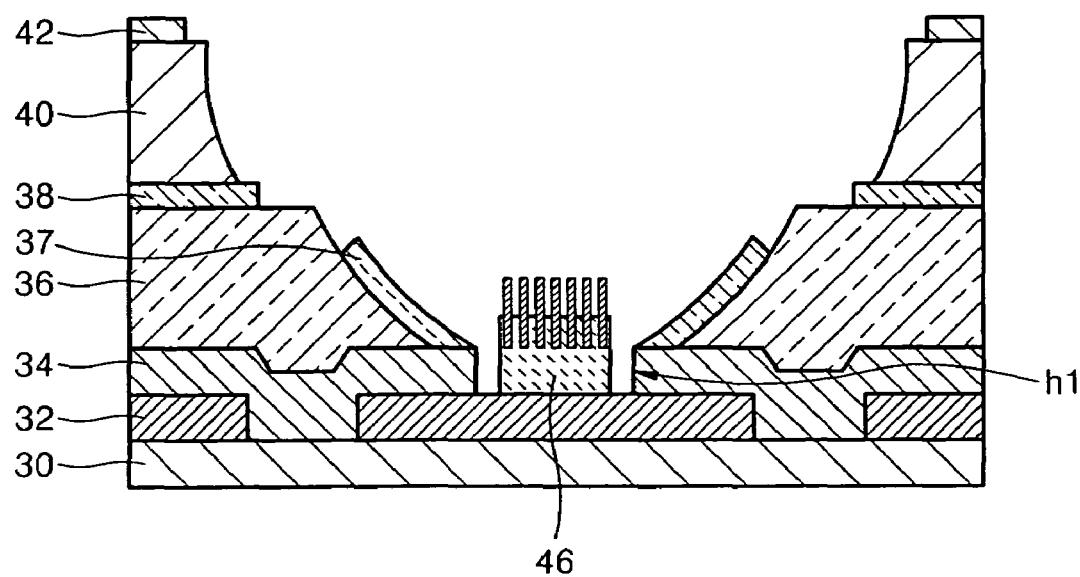

Referring to FIG. 31, a CNT paste 45 containing a negative photosensitive material is coated on the transparent electrode 32 as exposed through the hole 60, and the photosensitive CNT paste 45 is subjected to back exposure. Then, developing and baking steps are performed, thereby forming a CNT emitter 46, as shown in FIG. 32.

Figure 33:
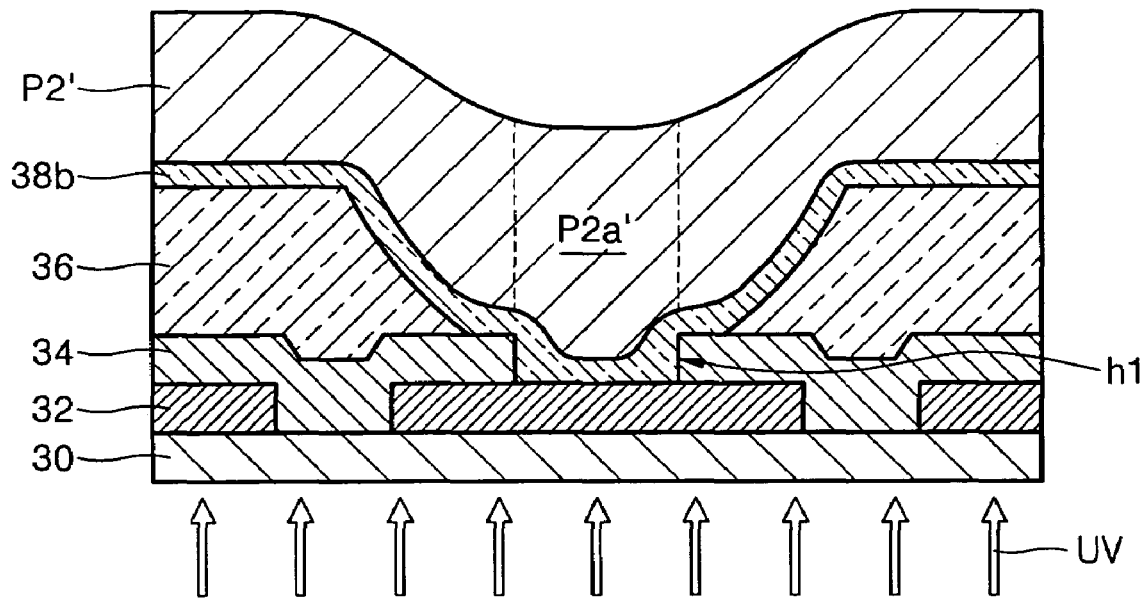
FIGS. 33 and 34 are cross-sectional views showing other exemplary methods of forming an electrode different from those shown in FIGS. 21 thru 24.
Figure 34:
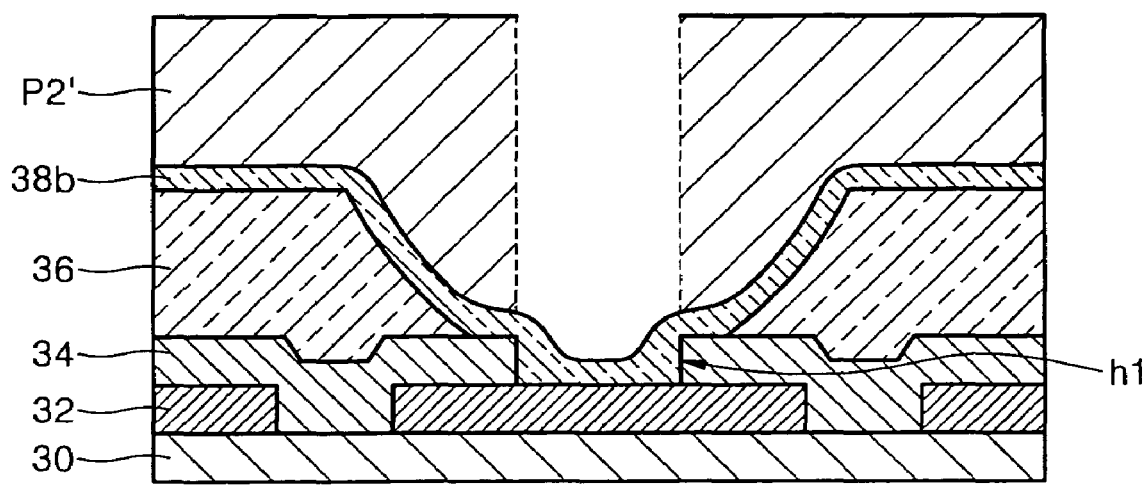

Subsequent steps for forming the CNT FED are the same as in the conventional process. FIGS. 21 thru 24 show the electrode 38a formed on the gate insulating layer 36 by electron beam deposition and a lift-off process, but the invention is not limited thereto. Alternatively, as shown in FIG. 33, chrome may be sputtered on the gate insulating layer 36 and the transparent electrode 32 to form an electrode 38b, followed by coating with a photoresist layer P2', producing an exposed area P2a' in the photoresist layer P2' by back exposure. Then, a developing process is performed to etch the exposed electrode 38b using the patterned photoresist layer P2' as shown in FIG. 34, thereby obtaining a product which is the same as that shown in FIG. 24.

FIG. 37 show the results of a computer simulation performed with respect to trajectories of electron beams emitted from emitters of the FED according to the present invention. Referring to FIG. 37, electrons emitted from the CNT emitter 46 are primarily focused by the mirror electrode 37 and then secondarily focused by the focus gate electrode 42. The electrons travel with a directionality toward a phosphor layer facing the CNT emitter 46.

As described above, in the CNT FED according to the present invention, since the mirror electrode primarily focuses electron beams dispersed at a wide angle, the focusing effect is increased, and high color purity is thereby realized.

In terms of the manufacturing process, a mask layer defining a transparent electrode region in which a CNT emitter is to be formed is positioned between a transparent electrode and a gate insulating layer, and UV light is irradiated upward from a lower portion of the transparent electrode, thereby patterning a photoresist layer coated on the region where the CNT emitter is to be formed. Since a to-be-exposed area of the photoresist layer is determined by the mask layer, a separate mask for defining the to-be-exposed area of the photoresist layer is not required. That is, the to-be-exposed area of the photoresist layer is determined in a self-aligned manner by the mask layer. Therefore, the manufacturing process is simplified. Also, since it is not necessary to form a separate mask, the manufacturing cost of the CNT FED is reduced. Further, a large-area CNT FED can be manufactured using a general semiconductor technique without separate special equipment.

What is claimed is:

1. A method of manufacturing a field emission device which includes a glass substrate, a transparent electrode formed on the glass substrate, a carbon nanotube (CNT) emitter formed on the emitter electrode, and a gate stack formed around the CNT emitter for extracting electron beams from the CNT emitter and focusing the extracted electron beams onto a given position, wherein forming of the gate stack around the CNT emitter comprises the steps of:
   (a) forming a mask layer on the glass substrate to partially expose the transparent electrode through a via hole;
   (b) forming a gate insulating layer on the mask layer so as to fill the via hole;
   (c) patterning the gate insulating layer around the via hole so as to expose the transparent electrode;
   (d) forming an electrode on the gate insulating layer around the via hole;
   (e) removing a portion of the electrode disposed at an edge area between an inclined plane and a top plane of the gate insulating layer;
   (f) sequentially forming the focus gate insulating layer and the focus gate electrode on a remaining portion of the electrode after step (e); and
   (g) patterning the focus gate electrode and the focus gate insulating layer around the via hole so as to expose the transparent electrode through the via hole.

2. The method of claim 1, wherein the patterning of the gate insulating layer in step (c) comprises:
   depositing a photoresist layer on the gate insulating layer;
   exposing a portion of the photoresist layer formed over the via hole;
   removing the exposed portion of the photoresist layer;
   exposing the transparent electrode by etching the gate insulating layer using the photoresist layer having the exposed portion removed therefrom as an etch mask; and
   removing the photoresist layer.

3. The method of claim 2, wherein the exposing of the portion of the photoresist layer comprises irradiating ultraviolet (Ur) light from a bottom of the glass substrate.

4. The method of claim 2, wherein the forming of the electrode in step (d) comprises:
   coating a negative photoresist layer on the gate insulating layer so as to cover the exposed transparent electrode;
   exposing a portion of the photoresist layer formed over the via hole;
   removing an unexposed portion of the photoresist layer;
   forming the electrode on the gate insulating layer around an exposed portion of the photoresist layer; and
   removing the exposed portion of the photoresist layer.

5. The method of claim 4, wherein the exposing of the portion of the photoresist layer comprises irradiating ultraviolet (Ur) light from a bottom of the glass substrate.

6. The method of claim 4, wherein the electrode is formed on the gate insulating layer by electron beam deposition.

7. The method of claim 6, wherein the exposed portion of the photoresist layer is removed by a lift-off process.

8. The method of claim 2, wherein the forming of the electrode in step (d) comprises:
   forming an electrode on the gate insulating layer to cover the exposed transparent electrode by sputtering;
   coating a photoresist layer on the electrode;
   exposing a portion of the photoresist layer formed over the via hole;
   removing the exposed portion of the photoresist layer;
   etching the electrode using the photoresist layer having the exposed portion removed therefrom as an etch mask; and
   removing the photoresist layer.

9. The method of claim 8, wherein the exposing of the portion of the photoresist layer comprises irradiating ultraviolet (Ur) light from a bottom of the glass substrate.

10. The method of claim 1, wherein the removing of the portion of the electrode in step (e) comprises:
    coating a photoresist layer on the electrode to cover the via hole;
    forming a portion of the photoresist layer disposed at the edge area relatively thinly compared to a further portion of the photoresist layer disposed elsewhere;
    removing the portion of the photoresist layer disposed at the edge area by etching the photoresist layer using an $O_2$ plasma process to expose a portion of the electrode disposed at the edge area;
    forming a gate electrode on the gate insulating layer and a mirror electrode spaced apart from the gate electrode on the inclined plane of the gate insulating layer by wet etching the exposed portion of the electrode disposed at the edge area; and
    removing the photoresist layer.

11. The method of claim 1, wherein the patterning of the focus gate electrode in step (g) comprises:
    depositing a photoresist layer on the focus gate insulating layer;
    exposing a portion of the photoresist layer formed over the via hole;
    removing the exposed portion of the photoresist layer;
    wet etching the focus gate insulating layer using the photoresist layer having the exposed portion removed therefrom as an etch mask; and
    removing the photoresist layer.

12. The method of claim 11, wherein the exposing of the portion of the photoresist layer comprises irradiating ultraviolet (Ur) light from a bottom of the glass substrate.

13. The method of claim 11, wherein the patterning of the focus gate insulating layer in step (g) comprises:
    depositing a photoresist layer covering the patterned focus gate electrode onto the focus gate insulating layer;
    exposing a portion of the photoresist layer formed over the via hole;
    removing the exposed portion of the photoresist layer;
    wet etching the focus gate insulating layer using the photoresist layer having the exposed portion removed therefrom as an etch mask so as to expose the transparent electrode; and
    removing the photoresist layer.

14. The method of claim 13, wherein the exposing of the portion of the photoresist layer comprises irradiating ultraviolet (Ur) light from a bottom of the glass substrate.

15. The method of claim 1, further comprising step (h) of forming the CNT emitter on the exposed transparent electrode after forming the gate stack.

16. The method of claim 15, wherein the forming of the CNT emitter in step (h) comprises:
    coating a CNT paste containing a negative photosensitive material on the gate stack so as to cover the via hole;
    exposing a portion of the CNT paste over the via hole; and
    removing the CNT paste except for the exposed portion of the CNT paste.

17. The method of claim 16, wherein the exposing of the portion of the CNT paste comprises irradiating ultraviolet (UV) light from a bottom of the glass substrate.

* * * * *